Apr. 3, 1923.                                                            1,450,871
E. SCHIEGRIES
APPARATUS FOR MAKING OPEN MOLDS
Filed Jan. 25, 1922                    6 sheets-sheet 3
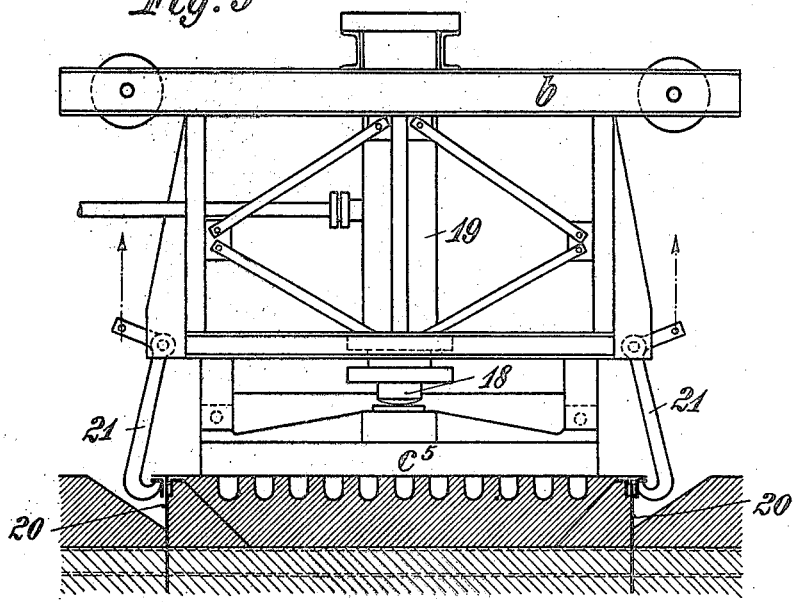
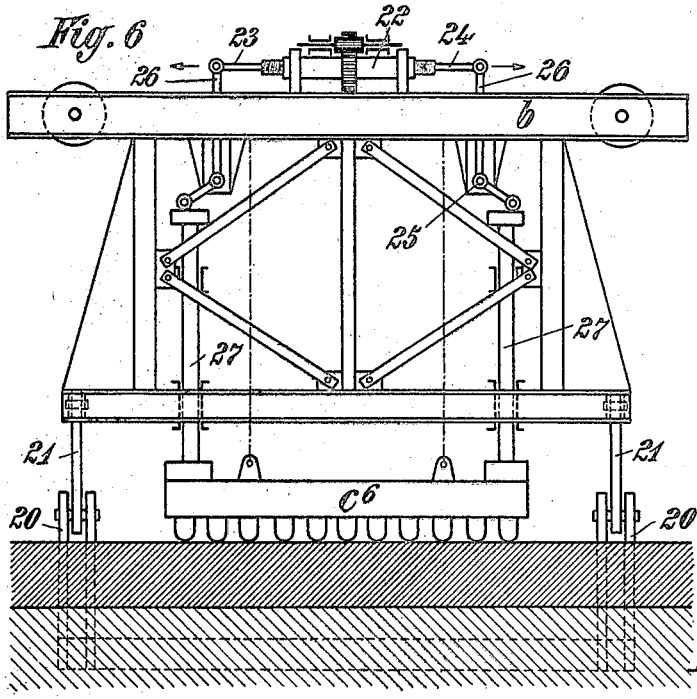
Inventor:
E. Schiegries
By Marks & Clerk
Attys

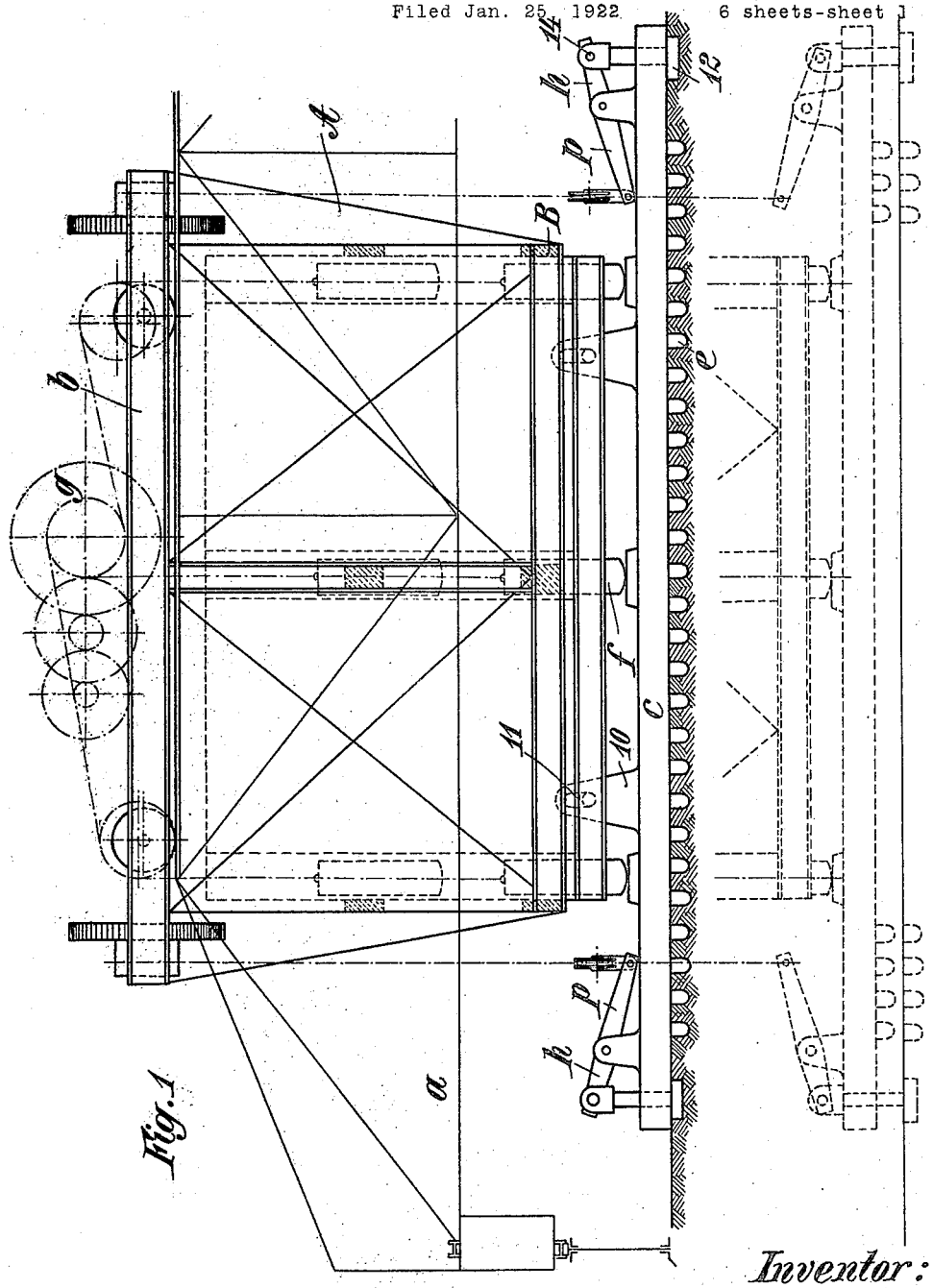

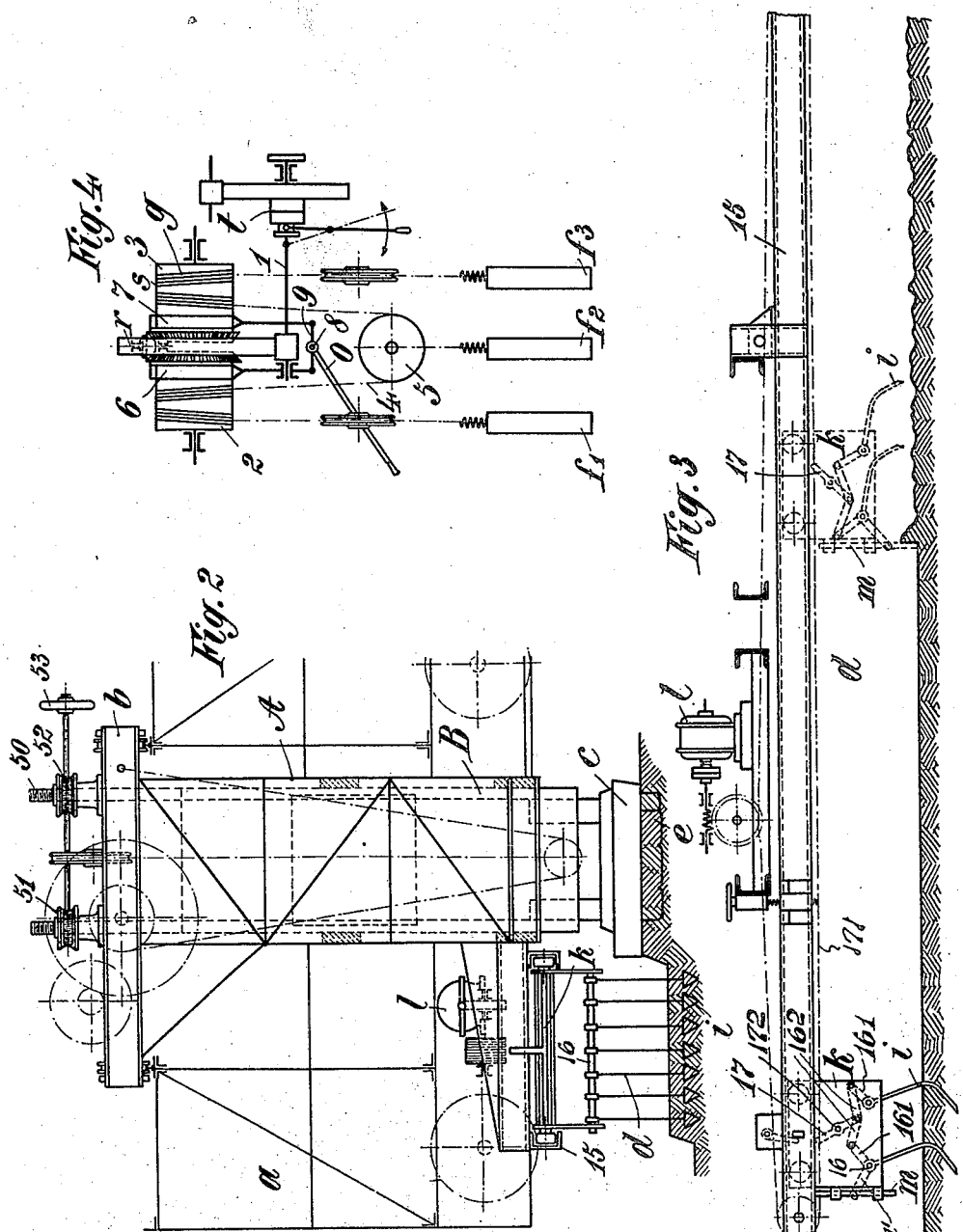

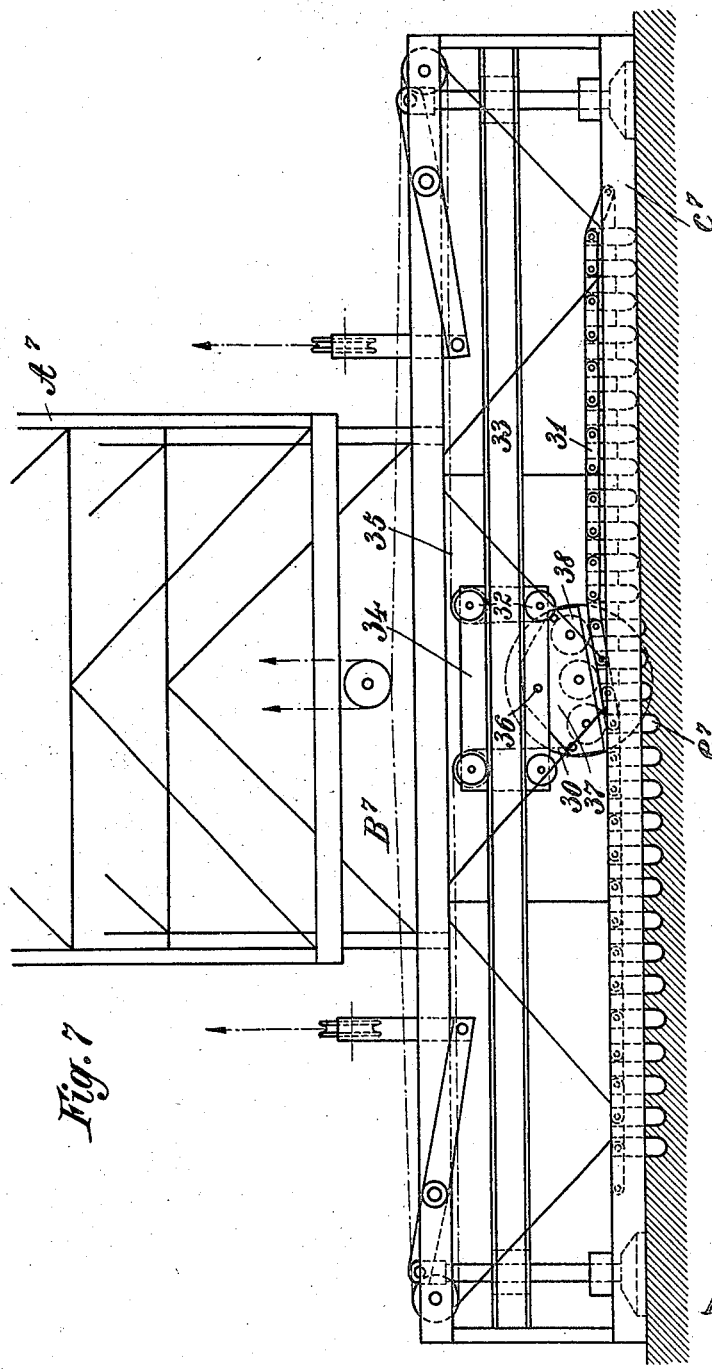

Apr. 3, 1923.　　　　　　　　　　　　　　　　　　　　1,450,871
E. SCHIEGRIES
APPARATUS FOR MAKING OPEN MOLDS
Filed Jan. 25, 1922　　　　6 sheets-sheet 5
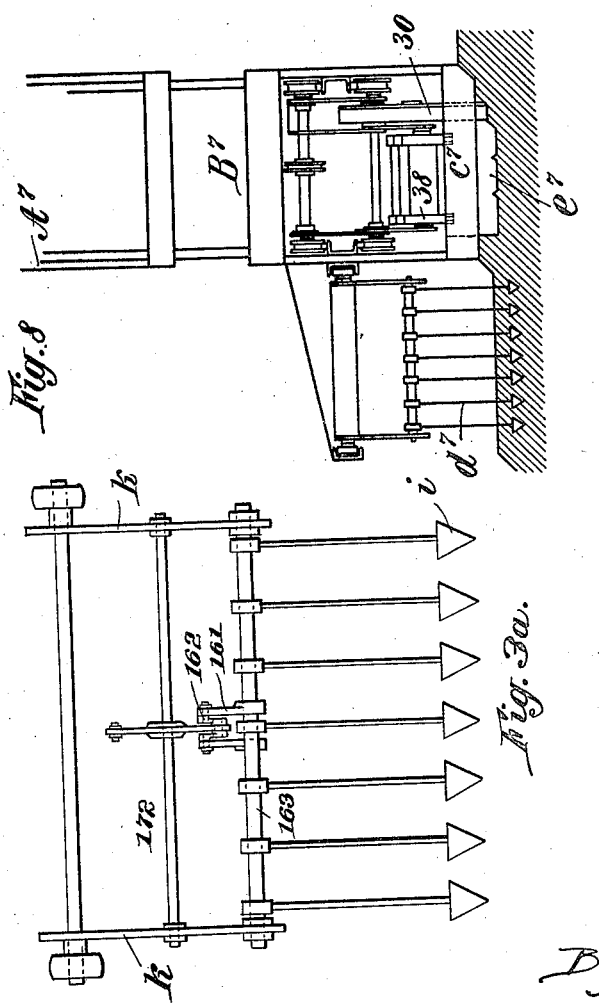
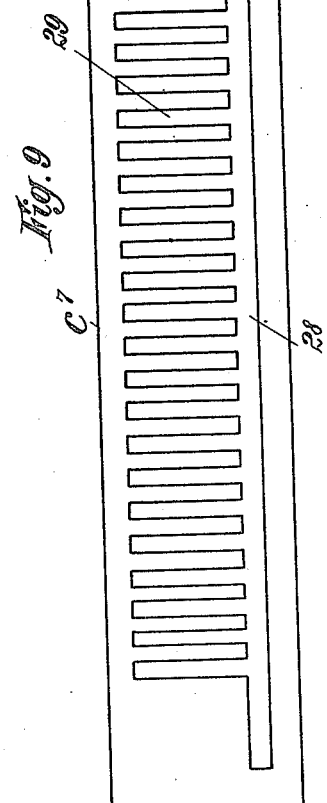
Inventor
E. Schiegries,
By Marks & Clerk
Attys.

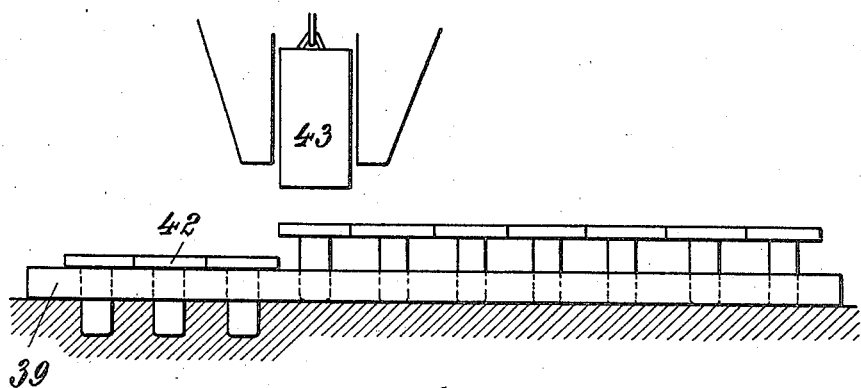
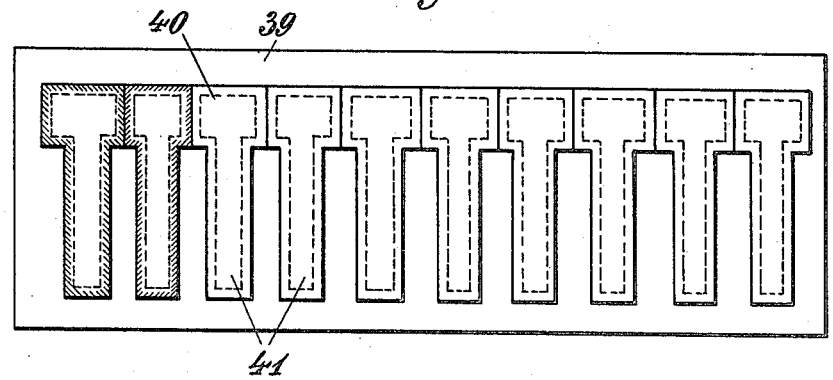

Patented Apr. 3, 1923.

1,450,871

UNITED STATES PATENT OFFICE.

EDUARD SCHIEGRIES, OF DUISBURG-MEIDERICH, GERMANY.

APPARATUS FOR MAKING OPEN MOLDS.

Application filed January 25, 1922. Serial No. 531,685.

*To all whom it may concern:*

Be it known that I, EDUARD SCHIEGRIES, a subject of Germany, and residing at Duisburg-Meiderich, Sommerstrasse 73, Germany, have invented certain new and useful Improvements in or Relating to Apparatus for Making Open Molds, of which the following is a specification.

My invention relates to improvements in apparatus for making open molds, and more particularly in apparatus for making molds for pigs. Heretofore the open molds for pigs and the like were made by hand work, for which purpose a large number of men were necessary. The object of the improvements is to provide mechanical means for making pig molds and the like. In the preferred form said mechanical means comprise means for dressing the mold bed and means for making the molds, both of said means being mounted on a common frame for simultaneous operation each on a part of the mold bed, and said frame is movable so that after shifting the same the mold making means are in position for making the molds in the portion of the bed which before has been prepared by the dressing means.

In order that my invention be more clearly understood several examples embodying the same have been shown in the accompanying drawings, in which the same reference characters have been used in all the views to indicate corresponding parts.

In said drawings,—

Fig. 1, is a diagrammatical front view of my improved mold making machine, the means for dressing the mold bed being omitted, Fig. 2, is a diagrammatical side view of Fig. 1, Fig. 3, is a diagrammatical front view similar to that shown in Fig. 1 and showing the dressing means, Fig. 3ª, is an end view showing the dressing apparatus on an enlarged scale.

Fig. 4, is a diagrammatical view showing the drop hammers and the drive thereof, Fig. 5, is a front view showing a modification of the mold making means, Fig. 6, is a similar view showing a further modification of the mold making means, Fig. 7, is a diagrammatical view showing another modification of the mold making means, Fig. 8, is a side view of Fig. 7, Fig. 9, is a plan view showing the plate guiding the mold patterns, Fig. 10, is a partial front view showing a modification of the mold making means, and Fig. 11, is a plan view of Fig. 10 showing the mold patterns and the plate guiding the same.

Referring now to the example shown in Figs. 1 to 4 on a travelling gantry or crane $a$, a travelling crab $b$ is mounted, and to the crab a frame A is secured which forms a guide for a frame B. From the latter is suspended a moulding plate $c$ and a device $d$ for preparing the sand. By means of the frame B the moulding plate $c$ and the sand-preparing or dressing device are vertically adjustable in accordance with the descending pig bed and to that end a hoisting gear is used. To show what may be done, screw-threaded rods 50 are secured to the frame B which are adapted to be raised and lowered by means of worm wheels 51 screwed thereon and worms 52 operated by hand wheels 53. Fig. 1 shows in full lines the device in the highest position and in dotted lines in the lowest position.

The moulding plate $c$ is in the form of a long table-like plate, on the bottom face of which the patterns $e$ for the pigs are mounted. Above the said moulding plate a striking gear is provided which consists of three guided hammers $f_1$, $f_2$, and $f_3$ which are driven by means of a separate gear $g$ (see also Fig. 4). The latter can be controlled in such a manner that, if necesary, instead of all three hammers striking simultaneously, only two hammers would strike separately, on the right or left. This arrangement is of importance, as thereby it is possible to ram down the plate to a uniform depth throughout the whole of its length.

The gear $g$ (Fig. 4) is driven from a spindle 1 which acts on a planet gear $r$, at both sides of which are mounted two cable winding drums 2 and 3 which raise the hammers $f_1$ and $f_3$ respectively. Over the said winding drums passes also a cable 4 for a pulley 5 carrying the hammer $f_2$. By driving the planet gear $r$, the three hammers $f_1$, $f_2$, $f_3$ therefore will be uniformly raised until in a given position an automatic release takes place by the disengagement of a friction clutch $t$. The three hammers then drop simultaneously.

In order to enable the hammers to be operated singly, to the winding drums 2, 3 two brake drums or pulleys 6, 7 respectively are connected, the brake bands of which are secured to the ends of a double lever 9 pivoted at 8. When a hand lever O is turned in one direction, one brake pulley, for instance 6, will be tightened and therefore the drum 2 will be locked. The drum 3 rotates at double speed (owing to the planet gear) and at the same time the pulley 5 is raised, but only at half the speed. Only the hammers $f_2$ and $f_3$ will therefore be operative now with a different force of blow. When the lever O is turned in the opposite direction, the hammers $f_1$ and $f_2$ will be correspondingly raised.

To prevent the vibrations during the operation of the hammers $f_1$, $f_2$ and $f_3$ from being excessively transmitted to the frame B carrying the plate $c$ and therefore to the mold bed preparing or dressing device $d$ in brackets 10 (Fig. 1) by means of which the plate $c$ is suspended from the frame B longitudinal slots 11 are provided in which the bearing journals for the plates can slide.

To enable the plate $c$ to be raised after the ramming down, without the molds being damaged, between the hoisting device and the mold plate a device $h$ is inserted which, as long as the pig patterns are still embedded in the sand, makes it possible to raise the plate without shifting and at half the speed. This device is constituted by double levers $p$ pivoted to the plate $c$. With one end of the said levers engages the hoisting device, and with the other end rods 13 passing through the plate and carrying under the latter blocks 12. After the ramming in, the device is in the position shown in Fig. 1 in full lines. When the hoisting gear is started by cable traction, the levers $p$ will first turn about pivots 14 jointing the same to the rods 13, because the blocks 12 bear on the bed, and the plate $c$ will be raised without vibration and at a low speed corresponding to the ratio of leverage of the two arms of the levers $p$, the said plate being guided during this movement by the rods 13 until it strikes the enlarged heads of the rods 13 (see dotted lines Fig. 1). The plate will be thereupon raised at full speed.

The device $d$ for the dressing of the sand is arranged laterally on the frame B. A number of prongs $i$ (Fig. 3) provided with shares are rockingly mounted on a crab $k$ travelling in guides 15 and driven by a motor $l$. The prongs are secured to parallel shafts 16 rockingly mounted on the crab and each having an arm 161 keyed thereto, and the said arms are connected by two links 162 connected at their joints to a lever 17 keyed to a rock shaft 172 and connected to the traction cable 171. When the crab is travelling to the left (see the left hand position in Fig. 3), the prongs are forced into the sand and loosen the same. When it is travelling in the opposite direction, the prongs are swung out of the sand (see the right hand position), at the same time a stripper-off $m$ guided by the frame carrying the prongs and arranged obliquely of the direction of movement of the crab, is lowered by an arm $m'$ secured to one of the shafts 16 and flattens the bed and removes the excess of sand.

The operation of the device is as follows:—

As shown more particularly in Fig. 2, the whole mold bed is arranged in steps in the direction of the foundry and the step which is uppermost at the time is treated by the moulding plate, and at the same time the lower step is treated by the dressing device $d$. The frame from which the plate $c$ and the dressing device $d$ are suspended is lowered until the said plate comes to rest on the bed. The plate is thereupon rammed into the sand by means of the striking gear and the pig patterns are thus impressed in the bed. During this operation the dressing device is also started and automatically digs in the sand and loosens it, the cable 171 connected to the lever 17 pulling the crab to the left and rocking the lever 17 into the position shown at the left in Fig. 3 and the prongs $i$ downwardly and into the sand. At the beginning of the return movement of the crab the lever 17 and the prongs are rocked into the position shown in Fig. 3 in dotted lines and out of the sand, and the stripper $m$ is moved downwardly by the arm $m'$ for planing or flattening the sand and conveying the excess thereof to the lower step of the bed. The shaft is thereupon raised again with the pattern plate and the dressing device, and the operation repeated on the next lower step of the bed.

In the construction shown in Fig. 5, the pattern plate $c^5$ is acted upon by a piston 18 of a pressure cylinder 19 which is mounted in the frame. The bed is surrounded, on its working width to be provided with molds, by T-girders 20, under the flanges of which engage hooks 21 secured to the frame, for the purpose of taking up the counter-pressure.

In the construction shown in Fig. 6 similar hooks are provided. The pressing in of the pattern plate $c^6$ is effected by turning a sleeve 22 provided at the ends with right and left hand inner screw-threads owing to which rods 23, 24 are moved, the free ends of which engage bellcrank levers 26 which are pivoted at 25 and press on pressure rods 27 and force the latter against the pattern plate.

Figs. 7 and 8 shown a construction in which the patterns $e^7$ are movable relatively to the pattern plate and are consecutively driven or pressed into the bed.

The framework $B^7$ with the table $c^7$ carrying the mold patterns and the sand dressing device $d^7$ is guided in a separate framework $A^7$ and can be moved by means of any desired gear either alone or together with the framework.

The table $c^7$ is formed with a longitudinal slot 28 (Fig. 9) from which a number of transverse slots 29 extend to one side, the slots 28 and 29 being similar in form to a comb. The longitudinal slot 28 is intended to guide a pattern wheel 30 which makes the sow, and the transverse slots 29 to guide the patterns $e^7$ making the pigs. The latter are connected by a chain or links 31 and form a connected mold band. The pattern as well as the pattern wheel are interchangeable.

The pressing in of the patters $e^7$ and of the pattern wheel 30 into the sand bed already prepared by the device $d^7$, is effected by the movement of a truck 34 provided with rollers 32 and travelling on a separate track 33 in the frame $B^7$; the said truck 34 can be moved in any desired manner, for instance by means of a tractor device 35. On a shaft 36 of the truck a frame or rocker 37 is mounted in which the pattern wheel 30 as well as separate pressure rollers 38 are mounted. During the movement of the truck 34 the frame 37 takes up an oblique position to suit the direction of movement, and thus exercises on the patterns $e^7$ guided on the table $c^7$, or on the chain 31 connecting the same, a pressure corresponding to the traction force and to the oblique position of the truck, and presses the molds downwards. At the same time, the pattern wheel 30 is pulled forward. Owing to the traction force moving the truck 34 on the tractor device 38, the frame 37 with the pattern wheel 30 is held in its oblique position.

In Figs. 10 and 11 I have shown a modification which is similar in the construction of the mold patterns to the example shown in Figs. 7 to 9. However the sectional mold patterns are successively forced into the mold bed by drop hammers.

The plate 39 providing guides for the mold patterns is formed with a longitudinal slot 40 from which a number of transverse slots 41 branch off at right angles and which together correspond in shape to a sow with a number of pigs attached. These slots are intended for guiding the patterns 42 which are of such T-shape that they form a pig and an attached part of a sow, and in a way represent a kind of key. All the keys together correspond to the whole sow and pigs. The keys can be impressed into the sand singly and consecutively. In the example shown in Fig. 10, a hammer is provided for this purpose.

While in describing the invention reference has been made to particular examples embodying the same, I wish it to be understood that my invention is not limited to the constructions shown in the figures, and that various changes may be made in the general arrangement of the apparatus and the construction of its parts without departing from the invention.

It is also to be understood that the term "horizontal" is used to show that the surfaces of the pattern are in a horizontal plane to distinguish from roller patterns of the type shown in the U. S. Patent to Miles 358,982.

I claim:

1. In an apparatus of the class described, the combination, with a frame, of means for dressing the mold bed, a horizontal mold pattern located beside the dressing means and in position for making molds in the mold bed, means to move said pattern into position above the dressed bed, and means to exert pressure on the mold pattern for forcing the same vertically into the dressed mold bed, said dressing and pressure exerting means being adapted for simultaneous operation on different parts of the bed.

2. In an apparatus of the class described, the combination, with a frame, of means for dressing the mold bed mounted on said frame, a horizontal mold pattern mounted on the frame and vertically shiftable thereon independently of the dressing means, means to move said pattern into position above the dressed bed, and means adapted to act on said mold pattern for forcing the same vertically into the mold bed.

3. In an apparatus of the class described, the combination, with a frame, of means for dressing the mold bed mounted on said frame, a horizontal mold pattern mounted on the frame and vertically shiftable thereon independently of the dressing means, means to move said pattern into position above the dressed bed, and means adapted to act on said mold pattern for forcing the same vertically into the mold bed, said dressing means and means acting on the mold pattern being adapted for simultaneous operation on different parts of the bed.

4. In an apparatus of the class described, the combination, with the mold pattern, a carrier therefor, and means to force the pattern into the dressed mold bed, of pattern retracting means comprising rockers connected with the pattern and adapted when operating the retracting means first for loose engagement with relatively fixed parts providing fulcrums and thereafter for positive engagement with the carrier.

5. In an apparatus of the class described, the combination, with the mold pattern, a carrier therefor, and means to force the pattern into the mold bed, of pattern retracting means comprising guide members for the pattern adapted for loose engagement with relatively fixed parts, rockers jointed to said guide members, having fulcrums on said carrier and jointed to said retracting means so as to transmit the movement thereof to the carrier at a reduced ratio.

6. In an apparatus of the class described, the combination with a mold pattern made in sections, and means for guiding the individual mold sections of means for successively forcing said sections into a mold bed.

7. In an apparatus of the class described, the combination with a mold pattern made in sections, and a foraminated plate guiding said sections, of means for successively forcing said sections into a mold bed.

8. In an apparatus of the class described, the combination with a mold pattern made in spaced sections and means surrounding the mold sections for guiding said sections, of a travelling pressure member adapted for successively forcing said sections into a mold bed.

9. In an apparatus of the class described, the combination, with a frame, of a foraminated plate mounted on said frame, a mold pattern made in sections each guided in the foraminated portion of said plate, and a pressure member movable on the frame and adapted to successively force the sections into a mold bed.

10. In an apparatus of the class described, the combination, with a frame, of a plate cut out in the form of a comb having an elongated part and transverse branches and mounted on said frame, a mold pattern made in sections each guided in the transverse branches of the cut-out portion of the plate, a pressure member movable on the frame and adapted to successively force the sections into a mold bed, and a roller adapted to travel through the elongated part of the cut-out portion of the plate and to form a groove in the mold bed.

11. In an apparatus of the class described, the combination, with a frame, of a plate cut out in the form of a comb having an elongated part and transverse branches and mounted on said frame, a mold pattern made in sections each guided in the transverse branches of the cut-out portion of the plate, a pressure member movable on the frame and adapted to successively force the sections into a mold bed, and a roller connected with the pressure member and adapted to travel through the elongated part of the cut-out portion of the plate and to form a groove in the mold bed.

12. In an apparatus of the class described, the combination, with a frame, of a mold pattern made in sections and mounted on said frame, and a pressure member movable on said frame and comprising pressure rollers adapted for engagement with said sections and for successively forcing the same into a mold bed.

13. In an apparatus of the class described, the combination, with a frame, of a mold pattern made in sections and mounted on said frame, a track movable on said frame, pressure rollers on said truck having their pressure side disposed obliquely to said mold pattern and adapted successively to force said sections into a mold bed.

14. In an apparatus of the class described, the combination, with a frame, of a mold pattern made in sections and mounted on said frame, a truck movable on said frame in either direction, a rocker on said truck carrying pressure rollers adapted successively to force said sections into a mold bed, and means to rock said rocker when moving the truck with the pressure side of the rollers inclined in the direction of the movement of the truck rearwards and downwards relatively to the mold pattern.

15. In an apparatus of the class described, the combination, with a frame, a truck movable on said frame in either direction, a rocker on said truck carrying pressure rollers adapted successively to force said sections into a mold bed, and a tension member connected with its ends to opposite sides of said rocker and adapted when operated in either direction to move the truck and to rock the rocker into position with the pressure side of the rollers inclined in the direction of the movement of the truck rearwards and downwards relatively to the mold pattern.

16. In an apparatus of the class described, the combination, with a frame, of a mold pattern made in sections and mounted on said frame, a truck movable on said frame, in either direction, a rocker on said truck carrying pressure rollers adapted successively to force said sections into a mold bed, a pattern roller on said rocker adapted when moving the truck to form a groove in the mold bed, and a tension member connected with its ends to opposite sides of said rocker and adapted when operated in either direction to move the truck and to rock the rocker into position with the pressure side of the rollers inclined in the direction of the movement of the truck rearwards and downwards relatively to the mold pattern.

17. In an apparatus of the class described, the combination with a mold pattern made in sections, and a flexible member connecting said sections, of means for successively forcing said sections into a mold bed.

18. In an apparatus of the class described, the combination, with a frame, of a foraminated plate mounted on said frame, a mold pattern made in sections each guided in the foraminated portion of said plate, a flexible member connecting said sections, and a pressure member movable on the frame and adapted to successively force the sections into a mold bed.

19. In an apparatus of the class described, the combination, with a frame, of a foraminated plate mounted on said frame, a mold pattern made in sections each guided in the foraminated portion of said plate, links connecting said sections, and a pressure member movable on the frame and adapted to successively force the sections into a mold bed.

In testimony whereof I hereunto affix my signature in the presence of two witnesses.

EDUARD SCHIEGRIES.

Witnesses:
 PARKER,
 LEHURH.